(12) United States Patent
Bruins et al.

(10) Patent No.: US 12,553,879 B2
(45) Date of Patent: Feb. 17, 2026

(54) APPARATUS FOR ANALYSIS OF EGGS

(71) Applicant: VISCON GROUP HOLDING B.V., S-Gravendeel (NL)

(72) Inventors: Wouter Sebastiaan Bruins, Leiden (NL); Wil Marijn Stutterheim, Leiden (NL)

(73) Assignee: VISCON GROUP HOLDING B.V., S'-Gravendeel (NL)

( * ) Notice: Subject to any disclaimer, the term of this patent is extended or adjusted under 35 U.S.C. 154(b) by 1217 days.

(21) Appl. No.: 17/166,035

(22) Filed: Feb. 3, 2021

(65) Prior Publication Data

US 2021/0215663 A1    Jul. 15, 2021

Related U.S. Application Data

(62) Division of application No. 14/418,506, filed as application No. PCT/NL2013/050569 on Jul. 30, 2013, now abandoned.
(Continued)

(30) Foreign Application Priority Data

Jul. 30, 2012   (NL) .................................... 2009255
Jul. 30, 2012   (NL) .................................... 2009256

(51) Int. Cl.
*G01N 33/483* (2006.01)
*G01N 33/08* (2006.01)
(Continued)

(52) U.S. Cl.
CPC ......... *G01N 33/4833* (2013.01); *G01N 33/08* (2013.01); *G01N 33/5091* (2013.01); *C12N 7/00* (2013.01)

(58) Field of Classification Search
CPC . G01N 33/4833; G01N 33/08; G01N 33/5091
See application file for complete search history.

(56) References Cited

U.S. PATENT DOCUMENTS 5,158,038 A    10/1992 Sheeks et al.
5,575,237 A    11/1996 Ferguson
(Continued)

FOREIGN PATENT DOCUMENTS

CA    2750877 A1    7/2010
CN    1232545 A    10/1999
(Continued)

OTHER PUBLICATIONS

Perederiy. "Methane from biomass." LesProminform 74(8): 164 (2010) found on Jun. 21, 2017, on Internet [on-line] https://lesprominform.ru/jarticles.html?id=2125 [English Translation Included].
(Continued)

*Primary Examiner* — Natalia Levkovich
(74) *Attorney, Agent, or Firm* — KDW Firm PLLC (57) ABSTRACT

The present invention relates to a process for the non-destructive determination of gender, developmental stage and/or viability of an avian embryo in an egg, comprising (a) detecting at least a first developmental marker compound selected from sugars and/or amino acids, precursors and metabolites thereof in an egg at a time period of from the beginning of the incubation of the egg until the hatching; (b) measuring the amount of the at least first detected developmental marker compound, and (c) comparing the amount to a base line established for male and female, developmental stage of the embryo, and/or alive and deceased or non-developed embryo, to determine whether the embryo is viable, male and/or female, and/or the developmental stage of the embryo.

15 Claims, 3 Drawing Sheets

Related U.S. Application Data (60) Provisional application No. 61/677,227, filed on Jul. 30, 2012.

(51) Int. Cl.
*G01N 33/50* (2006.01)
*C12N 7/00* (2006.01)

(56) References Cited

U.S. PATENT DOCUMENTS

| | | | |
|---|---|---|---|
| 5,784,992 | A | 7/1998 | Petite et al. |
| 6,029,080 | A | 2/2000 | Reynnells et al. |
| 6,240,877 | B1 | 6/2001 | Bounds |
| 6,286,455 | B1 | 9/2001 | Williams |
| 6,365,339 | B1 | 4/2002 | Daum et al. |
| 6,506,570 | B1 | 1/2003 | Phelps |
| 6,510,811 | B1 | 1/2003 | Gore et al. |
| 7,041,439 | B2 | 5/2006 | Phelps et al. |
| 7,418,922 | B2 | 9/2008 | Wolfe et al. |
| 8,624,190 | B2 | 1/2014 | Steiner et al. |
| 2003/0096319 | A1 | 5/2003 | Phelps |
| 2004/0065263 | A1* | 4/2004 | Hebrank ............... A01K 43/00 119/6.8 |
| 2006/0160080 | A1 | 7/2006 | Clinton |
| 2011/0144473 | A1 | 6/2011 | Opitz et al. |
| 2011/0189720 | A1 | 8/2011 | Goldstein |
| 2014/0199701 | A1 | 7/2014 | Van Veen |
| 2015/0260704 | A1 | 9/2015 | Bruins et al. |
| 2016/0257922 | A1 | 9/2016 | Goldstein |
| 2017/0205353 | A1 | 7/2017 | Galli et al. |

FOREIGN PATENT DOCUMENTS

| | | |
|---|---|---|
| CN | 1313726 A | 9/2001 |
| CN | 102210708 A | 12/2011 |
| CN | 102565269 A | 7/2012 |
| EP | 1543323 A2 | 6/2005 |
| EP | 2369336 A1 | 9/2011 |
| JP | 2009540319 A | 11/2009 |
| JP | 2012042471 A | 3/2012 |
| JP | 2012116665 A | 6/2012 |
| RU | 2406371 C1 | 12/2010 |
| WO | 1998014781 A1 | 4/1998 |
| WO | 2002083848 A2 | 10/2002 |
| WO | 2007144606 A2 | 12/2007 |

OTHER PUBLICATIONS

Sanitary Regulations and Standards 2.3.6.1079-01, Sanitary-epidemiological requirements to catering institutions, manufacturing and circulation of food products and food stock by them, Ministry of Health of the RF, Moscow, 2002, found on Jun. 21, 2017 on Internet [on-line] at http://www.gosthelp.ru/text/sanpin2361079 01sanitarnoe.html [English Translation Included].

Aslam et al. "Yolk concentrations of hormones and glucose and egg weight and egg dimensions in unincubated chicken eggs, in relation to egg sex and hen body weight." General and Comparative Endocrinology 187: 15-22 (2013).

Beato et al., "Avian influenza viruses in poultry products: a review", Avian Pathol. 38(3): 193-200 (2009).

Chinese Office Action for Chinese Patent Application No. 201380046983.6 112013; English Translation.

Feng et al., "Analysis of Metabolites in Allantoic Fluid of Chicken Embryo by 900 Mhz NMR Spectroscopy", Applied Magnetic Resonance 32(3):257-268 (2007).

Gu et al., "Developmental Changes of Several Free Amino Acids in Fetal Fluids of Chickens", Chinese Journal of Animal Science, 7:23-25 (2012). (Abstract only).

International Search for WO 02/083848 (mailed May 5, 2003).

Lu et al., "Development Changes of Plasma Insulin, Glucagon, Insulin-like Growth Factors, Thyroid Hormones, and Glucose Concentrations in Chick Embryos and Hatched Chicks", Poultry Science 86; 673-683 (2007).

Ohta et al., "Embryo Growth and Amino Acid Concentration Profiles of Broiler Breeder Eggs, Embryos, and Chicks After In Ovo Administration of Amino Acids", Poultry Science, 80:1430-1436 (2001).

Roos Molenaar et al., "High Environmental Temperature Increases Glucose Requirement in the Developing Chicken Embryo", PLOS One 8(4):e59637 (2013).

Rupe et al. "Amino acid studies in the transformation of proteins of the hen's egg to tissue proteins during incubation." Journal of Biological Chemistry 213: 899-906 (1955).

Search Report and Written Opinion for Priorty Netherlands application NL2009256 (mailing date Feb. 6, 2013) and English translation of Part I, V + VIII of the Written Opinion.

Search Report and Written Opinion of Priority Netherlands application NL2009255 (mailing date Sep. 27, 2012) and English translation of Part I, V + VIII of the Written Opinion.

Ricks et al. "The embryonated egg: a practical target for genetic based advances to improve poultry production." Poultry science 82.6 (2003): 931-938.

\* cited by examiner

APPARATUS FOR ANALYSIS OF EGGS

CROSS-REFERENCE TO RELATED APPLICATIONS

This application is a divisional under 35 U.S.C. § 121 of co-pending U.S. Ser. No. 14/418,506 filed Jan. 30, 2015, which is a 35 U.S.C. § 371 National Phase Entry Application of International Application No. PCT/NL2013/050569 filed Jul. 30, 2013, which designates the U.S. and claims benefit under 35 U.S.C. § 119 (e) of NL Application No. 2009256 filed on Jul. 30, 2012. U.S. Provisional Application No. 61/677,227 filed on Jul. 30, 2012, and NL Application No. 2009255 filed Jul. 30, 2012, the contents of which are incorporated herein by reference in their entireties.

FIELD OF THE INVENTION

The present invention relates to a process for the determination of the gender, developmental stage and/or viability of an avian embryo in ovo, by determining the presence of developmental markers in the egg, more specifically in the allantoic fluid. The present process further refers to a process for the determination of viability of an avian embryo, and the selection of male eggs and female eggs, and to the production of vaccines and/or chicks using these selected eggs.

BACKGROUND OF THE INVENTION

Fertilized eggs of most avian species, in particular those reared commercially, such as domesticated chicken (*Gallus gallus domesticus*), ducks, geese and turkeys tend to result upon hatching in an about equal distribution of male and female chicks. In hatchery management, it may be desirable to separate birds based upon various characteristics, in particular gender. It may for instance be desirable to inoculate male and female birds with different vaccines, or to separate the populations to gain feed efficiencies, improve processing uniformity, and to reduce production costs where there are differences in growth rate and nutritional requirements of male and female birds. Yet further, for commercial egg production, the incubation and rearing of male chicks is highly undesirable, leading to the culling of billions of male chicks every year.

Furthermore, there is a percentage of eggs that are unfertilized, or do not comprise a viable embryo at the beginning of the incubation period, which greatly reduces the capacity of the incubators at hatcheries. So far, determination of viable, i.e. live embryos, typically was performed employing a technique known as "candling", as for instance disclosed in EP-A-2369336 and U.S. Pat. No. 7,950,349.

Herein, an egg is inspected using a light source emitting light of a wavelength that permits to pass at least in part through the egg.

While this may permit to identify whether an egg contains a live embryo, however, in order to yield reliable results, it will require the egg to have progressed at least to day 11, or even to a later stage of its development. Furthermore, although this technique may discriminate between live and non-live eggs, it does not allow to reliably determine the gender and other characteristics of the unhatched birds.

As a result, an incubation capacity of present chick farms is required which is at least twice as large as necessary if an early gender selection would be available, permitting the selection of primarily only female chick embryos.

Accordingly, it would be of great value for the environment, by reduction of the amount of energy and other resources required, but equally for the elimination of unnecessary male chick culling, as well as reduction of stress for the newly hatched birds, if an early stage method was available that allowed to determine the gender of avian embryos prior to the incubation phase, also permitting to strongly increase the capacity of hatcheries.

A further benefit would be if the method also permitted to select viable embryos over unfertilized and/or otherwise nonviable eggs, increasing the efficiency of the hatching process further.

Y. Feng et al. disclose in Appl. Magn. Reson. (2007), 32,257-268 the analysis of metabolites in allantoic fluid of chicken eggs at day 9 by NMR spectroscopy at super high field strength of 900 MHZ.

Gu D.-C. et al, Chinese Journal of Animal Science, Vol. 7, 23-25 discloses the analysis of free aspartic acid, glutamic acid, arginine and leucine concentrations in allantoic and amnionic fluids during egg breeding incubation of by HPLC. However, the disclosed process does not go beyond producing a base line for comparison of eggs of a not specified laying date, but simply establishes a base line for four amino acids. Furthermore, the disclosed examination method is destructive in that the eggs with live embryos were not allowed to mature to hatchlings after examination, or used for other purposes, such as vaccine production.

US-A-2003/0096319 and WO-A-2006124456 disclose methods of determining the gender of an avian embryo in an egg by determining the presence of an estrogenic steroid compound in a sample of embryonic fluid, such as allantoic fluid or blood from the avian egg. While this may be feasible without destruction of the egg, the amounts of estrogenic steroid are minimal, and the test will only be successful after development of the gonads, hence at a comparatively late point in the development of the embryo. Yet further, the method of WO-A-2006124456 would also likely require the modification of fluorescence markers for each species and subgroup thereof, or the genetic modification of such species.

Ohta Y. et al., Poultry Science, Vol. 80, Nr. 10, 1430-1346, discloses the effect of in ovo administration of amino acids, to see how this affects amino acid concentrations of embryos and other egg contents from broiler breeder eggs. This however is not a method to determine gender, viability and/or developmental stage of an avian egg.

SUMMARY OF THE INVENTION

Accordingly, the present invention relates to a process for the determination of gender, developmental stage and/or viability of an avian embryo in an egg, comprising (a) detecting at least a first developmental marker compound selected from sugars and/or amino acids, precursors and metabolites thereof in an egg at a time period of from the beginning of the incubation of the egg until the hatching; (b) measuring the amount of the at least first detected developmental marker compound, and (c) comparing the amount to a base line established for male and female, developmental stage of the embryo, and/or alive and deceased or non-developed embryo, to determine whether the embryo is viable, male and/or female, and/or the developmental stage of the embryo.

In a further aspect, the subject process also relates to a process for the determination of gender and/or viability of an avian embryo in an egg, comprising (a) detecting at least a first developmental marker compound selected from sugars and/or amino acids, precursors and metabolites thereof in an egg at a time period of from the beginning of the incubation of the egg until the hatching; (b) measuring the amount of the at least first detected developmental marker compound, and (c) comparing the amount to a base line established for male and female, and/or alive and deceased or non-developed embryo, to determine whether the embryo is viable, male and/or female.

In yet a further aspect, the subject invention relates to a process for the determination of the developmental stage of an avian embryo in an egg according to any one of the previous claims, comprising (a) detecting at least a first developmental marker compound selected from amino acids, precursors and metabolites thereof in an egg; (b) measuring the amount of the at least first detected developmental marker compound, and (c) comparing the amount to a base line established for the developmental stage from laying until hatching, to determine the developmental stage of the embryo and the time until hatching is likely to occur.

DETAILED DESCRIPTION OF THE INVENTION

The present invention now is described more fully hereinafter with reference to the accompanying drawing, in which a preferred embodiment of the invention is shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

The terms "avian" and "bird" as used herein, include males or females of any avian species, but are primarily intended to encompass poultry which are commercially raised for eggs or meat. Accordingly, the terms "bird" and "avian" are particularly intended to encompass chicken, turkeys, ducks, geese, quail and pheasant.

The term "incubation" herein refers to the process by which birds hatch their eggs, and to the development of the embryo within the egg after leaving the hen's tract. The incubation period herein refers to the uninterrupted time during which a particular egg is subjected to conditions emulating the brooding until the hatching, i.e. emergence of the birds, including any handling or transfers from e.g. an incubator to a hatchery unit, provided the development of a bird is not stalled.

The term "in ovo" as used herein, refers to bird embryos contained within an egg prior to hatch. The present invention may be practiced with any type of bird egg, including, but not limited to, (domesticated) chicken, turkey, duck, goose, quail, and pheasant eggs.

The terms "injection" and "injecting" herein encompass methods of inserting a device (typically an elongate device) into an egg or embryo, including methods of delivering or discharging a substance into an egg or embryo, methods of removing a substance (i.e., a sample) from an egg or embryo, and/or methods of inserting a detector device into an egg or embryo.

Preferably the determination according to the present invention is performed as a non-destructive method, i.e. allowing the thus tested avian embryos to grow, if so desired, or to subject it to further steps such as in ovo vaccine production, provided the embryo is viable.

The term "allantoic fluid" herein encompasses allantoic fluid with or without the presence of other egg materials. For example, the term allantoic fluid may include a mixture of blood and allantoic fluid. Embodiments of the present invention are not limited to extracting material from the allantoic fluid or from areas near the upper surface of an egg. Removal of material from the allantoic fluid as described herein is provided as merely one example of possible embodiments of the present invention. Various materials including but not limited to amnion, yolk, shell, albumen, tissue, membrane and/or blood, may be extracted from an egg and assayed to identify one or more developmental markers, as described below. Material may be extracted from eggs having virtually any orientation.

The term "predetermined location" herein indicates a fixed position or depth within an egg. For example, a device may be injected into an egg to a fixed depth and/or fixed position in the egg. In alternative embodiments, the injection may be carried out based on information obtained from the egg, e.g., regarding the position of the embryo or the subgerminal cavity within the egg.

The term "comparing the amount" advantageously may include a univariate or preferably multivariate analysis of the measured metabolites, and a determination of the association of an avian embryo with a certain population. The step may comprise determining the presence of the analytes, i.e. metabolites, in the sample material by multivariate statistical analysis of the mass spectral, NMR, or otherwise measured suitable data. The multivariate statistical analysis program preferably comprises a principal components analysis program, and/or a partial least-squares regression analysis program. The subject invention thus also pertains to a process, apparatus and system for determination of gender, developmental stage and/or viability of an avian embryo in ovo, comprising multivariate statistical analysis program, as well as a microprocessor implemented process for the determination thereof.

Processes and apparatus according to embodiments of the present invention may be utilized for identifying one or more characteristics of an egg at any time during the embryonic development period, also referred to as the incubation period thereof. Embodiments of the present invention are not limited to a particular day during the embryonic development period.

In the present process, the developmental markers may preferably be analysed invasively or non-invasively.

If the analysis is performed invasively, this typically includes the extraction of a sample of egg material. The sample is preferably taken from an embryonic fluid, preferably from the allantoic fluid, since this will least likely harm the embryo. The allantoic fluid typically is an excretory medium for the nitrogenous metabolites of an avian embryo. The allantoic fluid begins to form around day 3 of incubation, as disclosed by Hamburger, V and Hamilton, HL (1951). "A series of normal stages in the development of the chick embryo". Journal of Morphology 88 (1): 49-92.

Herein is indicated that the allantois was distinguishable at 65 hours after incubation, as a short, thick-walled pocket; not yet vesicular. After 72 hours, the allantois was vesicular, variable in size; on the average of the size of the midbrain, indicating that the allantois and the allantoic fluid are present as of day 3.

It attains a maximum volume on about day 13 of incubation and then wanes in volume as incubation continues due to moisture loss and fluid resorption, but is still present in significant volumes on day 18 of incubation.

The allantoic fluid is separated from the eggshell by the inner and outer shell membranes and the chorioallantoic membranes. Although the allantoic fluid encompasses the entire periphery of an embryonated egg, the allantoic fluid typically accumulates at the top of an egg directly underneath the membranes overlying the air cell.

The accumulation of the allantoic fluid at the top of the egg is due to gravity and displacement by the dense embryo and yolk sac. Attempting to accurately sample the allantoic fluid through the top of an egg while the egg is upright may be difficult due to the variability of the air space from egg to egg. Gravity can be used to pool the allantoic fluid in a localized site. When an egg is turned on its longitudinal axis, the allantoic fluid will pool at the top side of the egg, directly underneath the shell. Laying the egg on its longitudinal axis renders the allantoic fluid useful for extraction of a sample.

The extraction of material, such as allantoic fluid, from eggs may be performed in various ways, including penetrating the egg shell, and inserting a sampling cannula trough the membranes. A sample of the fluid to be sampled may then be retrieved, while the membrane and/or shell is actively sealed with a suitable sealant, or allowed to seal itself.

Suitable methods and apparatus for the penetration of eggs and invasively sampling of egg material are disclosed for instance in US-A-20070137577, WO-A-00/22921 or WO-A-99/34667. The thus taken sample is then preferably subjected to a suitable protocol to permit the detection of the developmental markers, and an analysis of the relative and/or absolute amounts of developmental markers present.

Figure 3:
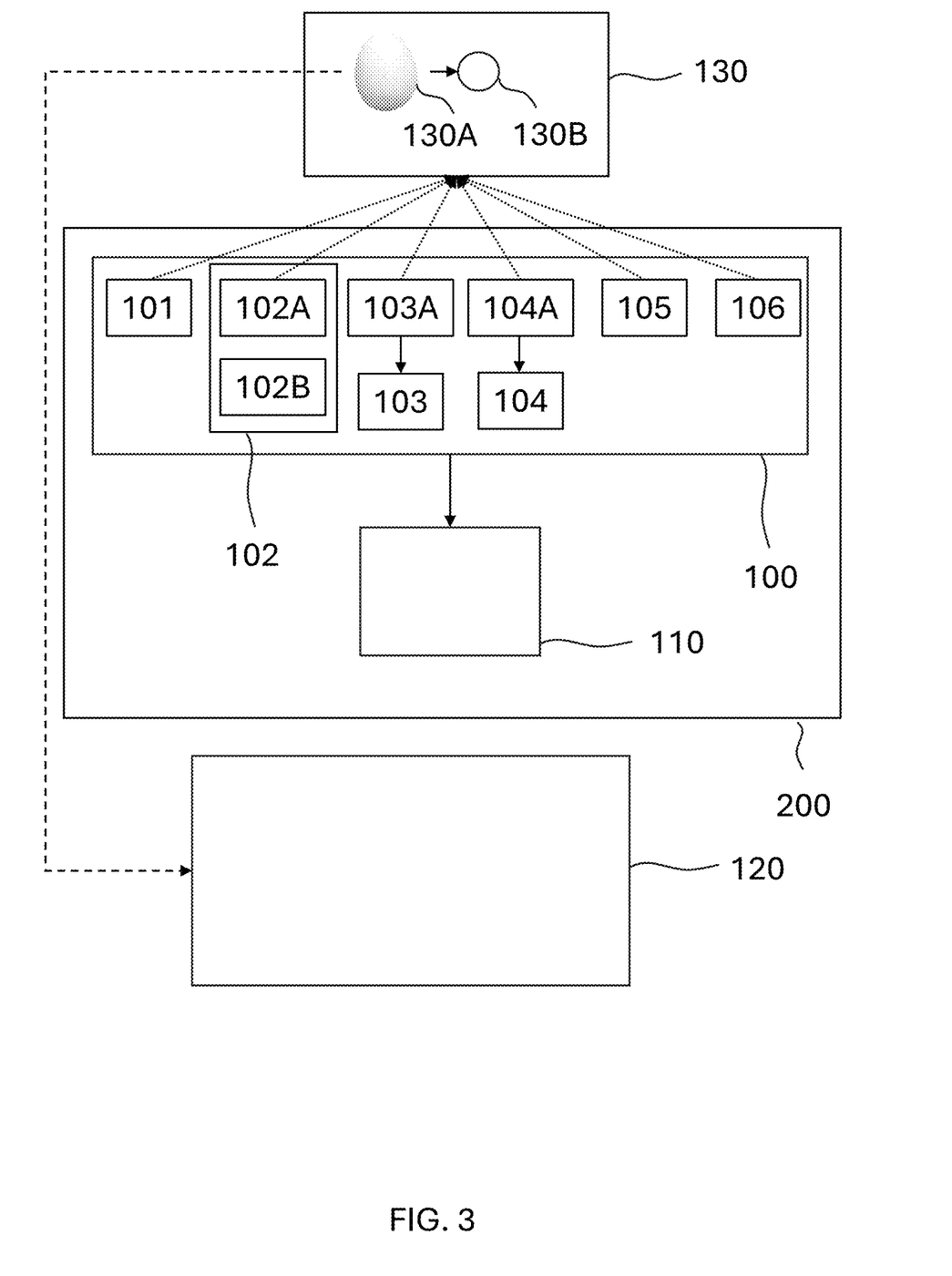
FIG. 3 depicts a system comprising an apparatus for identifying one or more characteristics of an egg at any time during the embryonic development period of an avian embryo in an egg and an incubator.

Now referring to FIG. 3, the sample 130, being either an egg 130A or a sample 130B of egg material extracted from egg 130A may be analysed by a quantitative analytic apparatus 100 that uses any method suitable to detect and to quantify the developmental marker or markers. Preferably, the analysis is performed by a magnetic resonance spectrometer 101 that uses a magnetic resonance imaging method including nuclear resonance methods; a spectral resonance spectrometer 102 that uses spectral resonance methods, which spectral resonance spectrometer 102 may include an apparatus 102A for performing Infrared (IR) spectroscopy, such as Fourier-Transform Infrared Spectroscopy (FTIR), or an apparatus 102B for performing Raman spectroscopy, and/or a Gas Chromatography (GC) apparatus 103 coupled with a suitable detector 103A, a High Pressure Liquid Chromatography (HPLC) apparatus 104 coupled with a suitable detector 104A, a fluorescence spectrometer 105 for performing fluorescence spectroscopy, and/or an enzyme-linked immunosorbent assay system 106 for performing an enzyme-linked immunosorbent assay, including wet and dry methods, such as using a dipstick method. While the invasive methods permit to take a sample 130B directly, and to subject the sampled fluid to an analysis, preferably the analysis is performed non-invasively due to the efficiency of such analysis method, and to the fact that the eggshell and membranes therein remain imperforated.

Any suitable method may be employed to perform such non-invasive analysis. Typically, quantitative spectral resonance methods including infrared or Raman spectroscopy may be employed, preferably using secondary spectra for the determination of the presence and absolute and/or relative amounts of developmental markers present in an egg 130A. While several publications have disclosed the use of non-invasive methods, e.g. US-A-2011/144473 and U.S. Pat. No. 7,950,349, these publications only vaguely describe overall emission spectra; which in practice do not permit to select the development stage the viability and/or the gender of an embryo. The present process differs in particular from the disclosed methods in that the presence of specific components in the egg is determined, which may advantageously be done by using secondary derivative spectra that allow to selectively seek for the absolute and relative amounts of one or more developmental marker compound(s).

In particular differential second-derivative Fourier transform infrared (FTIR) and FT-Raman spectroscopy, or combination thereof may advantageously be employed to achieve the necessary accuracy and repeatability, while nuclear magnetic resonance methods may suitably be employed to determine the nature of the developmental markers, and to establish a base line to calibrate the system.

The present process advantageously permits to determine, using for example a microprocessor 110, the viability, and/or gender of an embryo, and/or preferably the developmental stages from the beginning of the incubation, in an incubator 120, of the egg 130A until the hatching. Quantitative analytic apparatus 100 and microprocessor 110 jointly form an apparatus 200 for identifying one or more characteristics of an egg 130A at any time during the embryonic development period of an avian embryo in an egg 130A.

Preferably the determination is performed at a period of from 1 to 15 days, more preferably of from 2 to 14, yet more preferably of from 3 to 13, and even more preferably of from 4 to 12 days after the incubation is started, such as performing step a) preferably at a time period of from 6 to 12 days after the beginning of the incubation of the egg 130A.

This permits to avoid the costs involved in incubating eggs 130A that are either not viable and/or not the desired gender. Furthermore, the actual developmental stage of an egg can be determined. For species with shorter or longer incubation times than those of domesticated chicken, other periods may apply, as suitable.

The developmental markers according to subject invention preferably are selected from sugars, amino acids, and their respective metabolites and/or precursors.

Of these, developmental markers of particularly importance included Glucose, Choline and Valine, each of which had a statistically significant influence on the determination of the gender of the avian embryo.

Without wishing to be bound to any particular theory, Choline and trimethylglycine, its amino acid derivative, are considered to be particularly used to support the foetus's developing nervous system. It was found that the choline and trimethylglycine (betain) ratio differs strongly between male and female embryos, while also the absolute amounts of choline were higher in the allantoic fluid of female embryos. Generally, choline and its metabolites are needed for three main physiological purposes: structural integrity and signaling roles for cell membranes, cholinergic neurotransmission (acetylcholine synthesis), and a major source for methyl groups via its metabolite, Trimethylglycine (betaine) which participates in the S-adenosylmethionine (SAMe) synthesis pathways. Valine and Glucose on the other hand were also found to vary significantly between male and female embryos.

Where the avian species is *Gallus gallus domesticus*, preferably a first or further developmental marker is glucose in absolute amount for a female embryo in the range of from 30 µM/ml to 70 µM/ml, and for a male embryo of from 1 µM/ml to 30 µM/ml in the allantoic fluid.

A further first or further preferred developmental marker for *Gallus gallus domesticus* embryos is Choline, in an absolute amount for a female embryo in the range of from 110 µM/ml to 130 µM/ml, and for a male embryo of from 90 µM/ml up to, but not including 110 µM/ml, in the allantoic fluid.

Yet a further first or further developmental marker for *Gallus gallus domesticus* embryos preferably is Valine, in an absolute amount for a female embryo in the range of from 110 µM/ml to 130 µM/ml, and for a male embryo of from 90 µM/ml up to, but not including 110 µM/ml, in the allantoic fluid.

Preferably, in the subject process at least a second marker is detected in step (a), and wherein the at least first and second markers are analysed and compared to the base line, and to each other to establish a developmental marker ratio.

By correlating the analysis of two or three markers, the selectivity of the determination of viability and gender may advantageously be improved further. Accordingly, preferably at least a first and a second and/or further developmental marker are detected and analysed, wherein the absolute amounts and the ratio of the at least first to second and/or further markers is employed to determine the gender and/or viability.

The present process further advantageously comprises determining whether an embryo in an egg is viable and male, or viable and female, and separating a multitude of viable male eggs from a multitude of viable female eggs, to form a predominantly male or predominantly female egg selection.

The thus formed viable female or male egg selections may advantageously be subjected to an incubation and hatching process to form a predominantly female or male chick population.

The present process further preferably comprises injecting a virus or virus-like material into each egg identified as containing a live embryo and male or female, and preferably, after incubation comprises isolating the obtained vaccine from the incubated eggs.

After injection with a seed virus, the eggs containing live embryos are preferably transferred to an incubator for a predetermined period of time. At the end of this period of time, the eggs are transferred to a vaccine harvesting station where material from each egg, e.g., amniotic fluid is extracted.

Accordingly, the present process preferably also comprises the steps of euthanizing an embryo in the infected egg, and harvesting amniotic fluid from each euthanized egg, wherein the amniotic fluid comprises vaccine; and preferably isolating a vaccine from the amniotic fluid. Preferably the virus comprises human influenza virus, and hence the harvested amniotic fluid comprises human influenza vaccine.

The developmental markers according to subject invention preferably may also be employed to determine the age of an embryo, or other markers may suitably applied.

Developmental markers useful for the determination of the embryo age are preferably selected from amino acids, and their respective metabolites and/or precursors. Applicants found that in particular the absolute and relative amounts of amino acids, more preferably Trimethylglycine, also known as Betaine, Aspartate and Asparagine, Glutamate and Glutamine and Proline could be directly related to the developmental stage of an avian embryo in ovo. This is highly relevant, since there are few features that allow determining the developmental stage, or age, of an avian embryo, in particular at early stages of the development.

The present process accordingly also preferably permits to select eggs of essentially the same developmental stage, or actual age, and to combine a multitude of eggs of essentially the same age, to subject the eggs to a controlled incubation. The resulting hatching period should be more uniform, resulting in a more uniform chick population, of higher quality due to recued stress, and reducing the number of early hatched bird that are subject to prolonged exposure to the artificial incubation conditions.

The resulting hatched bird population will show a higher quality, resulting in a higher yield, and reduced follow-up requirements for the chick population, e.g. through reduced amounts of treatments.

Similarly, the use of age selected populations of eggs will also permit to prepare vaccines more efficiently, since herein the developmental stage of an avian embryo is relevant for the point in time when most efficiently a virus is injected, and a vaccine harvested.

The present invention also relates to egg selections, and after hatching, to a chick or a chick population obtainable by the process.

The following, non-limiting examples are provided to illustrate the invention.

Example 1

Protocol Metabolic Profiling in Ovo

*Gallus gallus domesticus* eggs were incubated at 37.8° C., turning every hour, in an incubator model 50, commercially obtainable from MS Broedmachines V.O.F.

One group of 12 eggs was incubated for 9 days, a second group of 12 eggs for 10 days, and a third group of 12 eggs for 11 days.

Eggs were taken out of the incubator, placed in a paper holder, under a microscope, with the air sack up. The shell and membranes were punctured and broken open around the air sack, leaving the inner membranes intact. Using light, the blood vessels running over the inner shell membrane were located, and a small puncture avoiding the blood vessels was made through the inner and outer membranes into the allantoic cavity.

The egg was skewed and a 1 ml pipette was then used to blow air into the cavity, after which 1.5 to 2 ml of allantoic fluid was extracted using the pipette. This was transferred into a cryovial, which was immediately plunged into liquid nitrogen. The samples were then taken out and stored in −80° C.

The embryo was taken out of the egg, by cutting away the membranes and by using a small spoon. It was put in a falcon tube filled with 96% ethanol and on ice and stored in a dark place at room temperature.

The allantoic fluid was taken out of −80° C., defrosted and a sample of 1 ml was taken out and put in a glass vial.

1 ml of chloroform and 1 ml of a mixture of methanol and water (1:1) were added to the sample, using glass Pasteur pipettes. The vials were closed using a cap and then shaken for 20 seconds, then placed at 4° C. for 10 minutes. Using a glass Pasteur pipette, 1 ml of the upper part of the mixture was taken out and transferred to a cryovial. The cap of this cryovial was punctured and it was freeze dried overnight. This freeze dried product was employed as NMR sample.

Example 2

Protocol Metabolic Profiling in Ovo

*Gallus gallus domesticus* eggs were incubated at 37.8° C. at a commercial hatchery, turning every hour, in an industrial incubator commercially available from Petersime NV. One group of 50 eggs was incubated for 8 days, a second group of 50 eggs for 9 days, and a third group of 50 eggs for 10 days.

Eggs were taken out of the incubator, placed in a plastic holder, under a microscope, with the air sack up.

The shell and membranes were punctured and broken open around the air sack, leaving the inner membranes intact. Using light, the blood vessels running over the inner shell membrane were located, and a small puncture avoiding the blood vessels was made through the inner and outer membranes into the allantoic cavity.

The egg was skewed and a 1 ml pipette was then used to blow air into the cavity, after which 1.5 to 2 ml of allantoic fluid was extracted using the pipette. This was transferred into a cryovial, which was immediately plunged into liquid nitrogen. The samples were then taken out and stored in −80° C.

The embryo was taken out of the egg, by cutting away the membranes and by using a small spoon. It was put in a falcon tube filled with 96% ethanol and on ice and stored in a dark place at room temperature.

The allantoic fluid was taken out of −80° C., defrosted and a sample of 0.5 ml of was put into cryovial. The cap of this cryovial was punctured and it was freeze dried overnight. This freeze dried product was employed as NMR sample.

Gender Determination—Verification:

The chicken embryo was taken out of the ethanol and left out to dry for 10 minutes at room temperature. A small portion of the left leg was cut off and this was used to extract DNA, using a DNA extraction kit (commercially obtainable as Qiagen DNeasy kit), after which the amount was measured using a nanodrop device.

PCR using primer pair 1272H and 1237L, commercially obtainable from Sigma, was used to determine the gender of the embryo. The PCR program used was, 95° C. for 5 minutes, then 36 times 95° C. for 45 seconds, 56° C. for 45 seconds, 72° C. for 1 minute, after which one run was done at 72° C. for 5 minutes. The gender of the embryo was determined based on the resulting PCR product, identified by using a 2% agar gel.

NMR Sample Preparation 50-100 mg of sample material obtained as described above were subjected to two-dimensional (2D)-$^1$H-$^1$H-J-resolved NMR measurements, using 3-(trimethylsilyl) propionic-2,2,3,3-d4 acid (TSP) as an internal standard, as disclosed in Nature Protocols, Vol. 5, No. 3, 2010, pages 536-549, and Phytochemistry 71, 2010, 773-784.

The obtained data for Example 1 is depicted in Table 1:

TABLE 1

Measured Data for Male and Female embryos

| Dev. Markers | Female (µM/mL; standard deviation in brackets) | Male (µM/mL; standard deviation in brackets) |
|---|---|---|
| Glucose | 51 (17.7) | 32.2 (10.5) |
| Choline | 125.8 (21.4) | 101.3 (21.1) |
| Valine | 23.7 (4.09) | 28.6 (3.63) |

Multivariate Data Analysis

A partial least square modelling, an unsupervised multivariate data analysis, was employed for the $^1$H NMR data to group samples based on all the metabolites detected in $^1$H NMR. The most important information obtained was the correlation between two data sets, i.e. the measured 1H NMR signals (metabolites) and the sample classification (group information).

Figure 1:
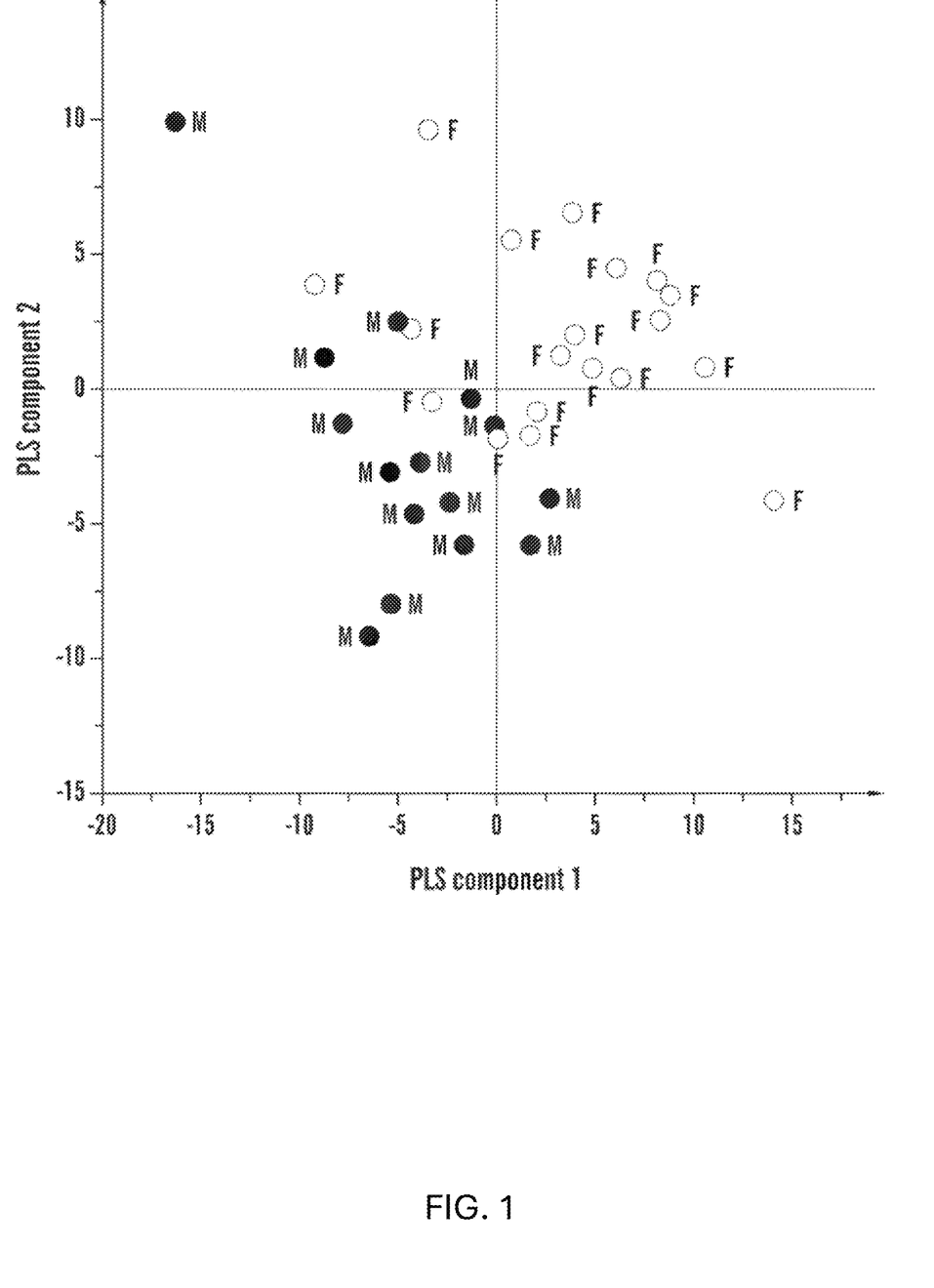
FIG. 1 depicts the partial least square modelling, an unsupervised multivariate data analysis, for $^1$H NMR data to group samples based on all the metabolites detected in $^1$H NMR from a laboratory set of chicken eggs. F represents female, M represents Male.
Figure 2:
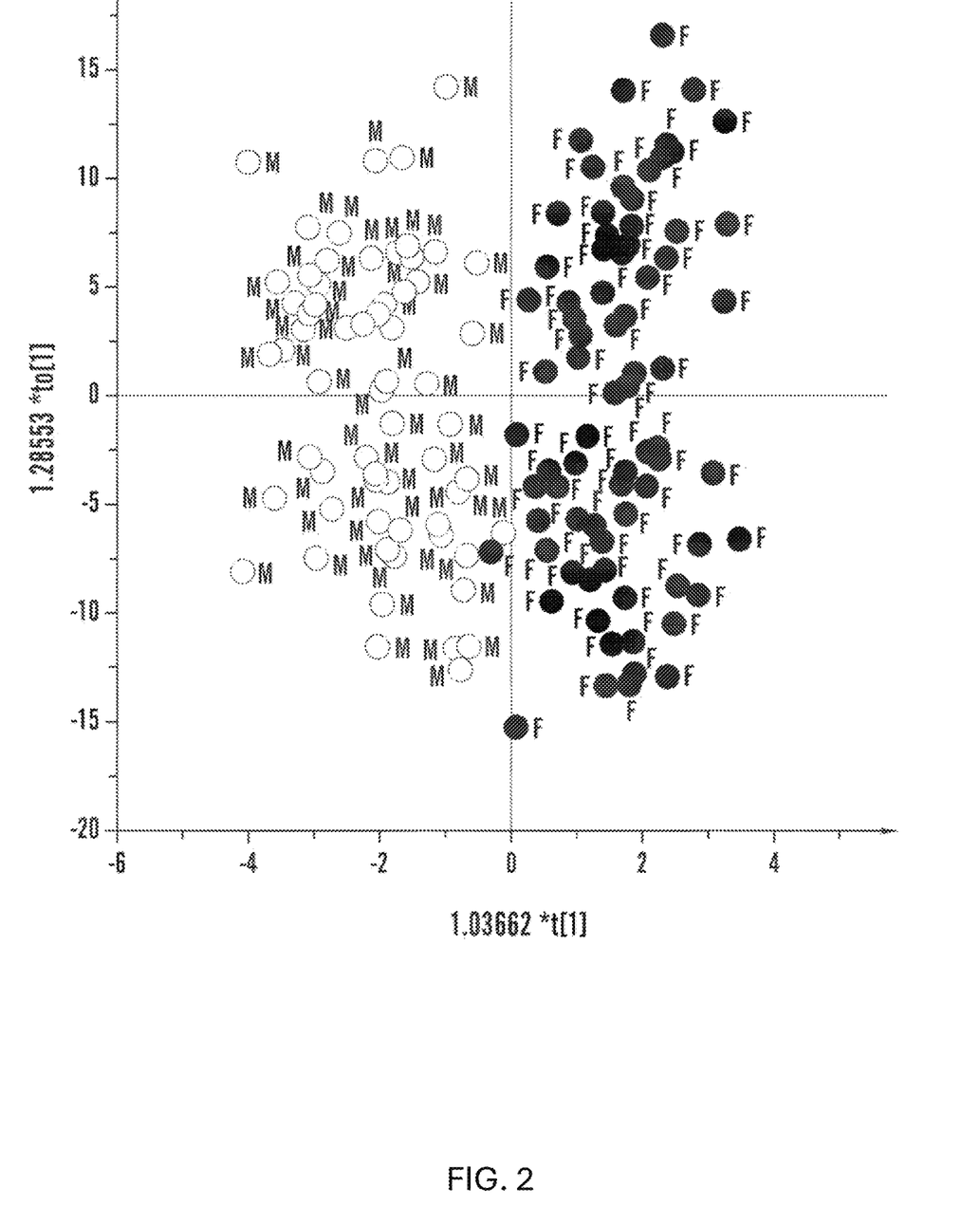
FIG. 2 depicts the partial least square modelling, an unsupervised multivariate data analysis, for $^1$H NMR data to group samples based on all the metabolites detected in $^1$H NMR of a larger test set from a commercial chicken hatchery. F represents female, M represents Male.

The analysis not only revealed the absolute amounts of developmental markers for either male or female embryos, but also the relative amounts. When a second marker and a third marker were added, respectively, the selectivity of the test increased further. FIGS. 1 and 2 disclose the results of a multivariate analysis of Example 1, and 2, respectively, and overlay with the gender determination.

Example 3

Determination of Embryo Age

Example 1 was repeated, however analysing the following developmental markers that were found relevant for the determination of the developmental stage, or age of the embryos.

TABLE 2

Measured Data for Days 9 to 11

| Development Marker | 9 days (µM/mL, Standard deviation in brackets) | 10 days (µM/mL) | 11 days (µM/mL) |
|---|---|---|---|
| Trimethylglycine (Betaine) | 0.75 (0.27) | 0.65 (0.2) | 0.43 (0.13) |
| Aspartate and Asparagine | 9.35 (3.2) | 7.72 (2.75) | 5.34 (3.91) |
| Glutamate and Glutamine | 41.5 (7.71) | 37.1 (3.94) | 31.7 (5.33) |
| Proline | 12.7 (2.69) | 11 (1.58) | 9.02 (1.59) |

The above data clearly indicates that the developmental stage of en embryo can be determined from one or more developmental markers.

A partial least square modelling, an unsupervised multivariate data analysis, was employed for the $^1$H NMR data to group samples based on all the metabolites detected in $^1$H NMR. The most important information obtained was the correlation between two data sets, i.e. the measured 1H NMR signals (metabolites) and the sample classification (group information).

The multivariate model demonstrated the association between gender, age and/or viability of an embryo and the relative amounts of metabolites present. Using alternative analytical methods, such as for instance GCMS, gave similar results, thereby corroborating the results.

The analysis not only revealed the absolute amounts of developmental markers for the developmental stage, but also the relative amounts. When a second, third and fourth marker were added, respectively, the selectivity of the test increased further.

The examples above clearly show the advantages of the process and materials of the present invention. Although several specific embodiments of the present invention have been described in the detailed description above, this description is not intended to limit the invention to the particular form or embodiments disclosed herein since they are to be recognised as illustrative rather than restrictive, and it will be obvious to those skilled in the art that the invention is not limited to the examples.

The invention claimed is:

1. A system comprising
   (a) a quantitative analytic apparatus selected from the group consisting of:
      a magnetic resonance spectrometer, a spectral resonance spectrometer, a GC coupled with a suitable detector, an HPLC coupled with a suitable detector, a fluorescence spectrometer, and an enzyme-linked immunosorbent assay system;
   for measuring the level of at least a first developmental marker compound selected from sugars and/or amino acids, precursors and metabolites thereof in an egg;
   (b) a microprocessor configured to receive data from the quantitative analytic apparatus and programmed to perform multivariate statistical analysis of the level of the at least a first developmental marker to compare the amount to a base line established for male and female, developmental stage of the embryo, and/or alive and deceased or non-developed embryo, to determine whether the embryo is viable, male and/or female, and/or the developmental stage of the embryo and identify viable female and viable male eggs; and
   (c) an incubator for subjecting the viable female and/or viable male eggs to an incubation and hatching process to form a predominantly female or male chick population, and/or for subjecting the viable egg selections to an incubation and hatching process in line with the expected hatching date, to form a chick population of predominantly the same developmental stage.

2. An apparatus for identifying one or more characteristics of an egg at any time during the embryonic development period of an avian embryo in an egg, comprising
   (a) a means for detecting at least a first developmental marker compound selected from sugars and/or amino acids, precursors and metabolites thereof in an egg at a time period of from the beginning of the incubation of the egg until the hatching;
   (b) a means for measuring the amount of the at least first detected developmental marker compound, and
   (c) a means for comparing the amount to a base line established for male and female, developmental stage of the embryo, and/or alive and deceased or non-developed embryo, to determine whether the embryo is viable, male and/or female, and/or the developmental stage of the embryo.

3. The apparatus according to claim 2, for non-destructive determination of gender, developmental stage and/or viability of an avian embryo in an egg, further comprising a multivariate statistical analysis program, as well as a microprocessor implemented process for the determination thereof.

4. The apparatus according to claim 2, wherein the at least first developmental marker compound is detected in an embryonic fluid of an egg.

5. The apparatus according to claim 2, configured to detect at least a second marker by (a), and analysing the at least first and second markers and comparing these to a base line, and to each other to establish a developmental marker ratio.

6. The apparatus according to claim 2, wherein the developmental markers for determining whether an embryo is male or female are selected from the groups consisting of Glucose, Choline and/or Valine; and wherein the developmental markers for determining the developmental stage and the time until hatching is likely to occur, and viability are selected from Trimethylglycine; Aspartate; Asparagine; Glutamate, and Proline.

7. The apparatus according to claim 6, wherein the avian species is *Gallus gallus domesticus*, and wherein in the allantois, Glucose is detected in absolute amount for a female embryo in the range of from 30 µM/ml to 70 µM/ml, and for a male embryo of from 1 µM/ml to 30 µM/ml; Choline is present in an absolute amount for a female embryo in the range of from 110 µM/ml to 130 µM/ml, and for a male embryo of from 90 µM/ml up to, but not including 110 µM/ml, and/or Valine is detected in an absolute amount for a female embryo in the range of from 110 µM/ml to 130 µM/ml, and for a male embryo of from 90 µM/ml up to, but not including 110 µM/ml.

8. The apparatus according to claim 2, configured to analyze the embryonic fluid invasively or non-invasively.

9. The apparatus according to claim 8, configured to perform the analysis by a magnetic resonance imaging method including nuclear resonance methods; by a spectral resonance method including infrared or Raman spectroscopy; and/or an analytical method such as GC or HPLC coupled with suitable detectors, fluorescence spectroscopy and/or an enzyme-linked immunosorbent assay.

10. The apparatus according to claim 2, further comprising means for determining whether an embryo in an egg is viable and male, or viable and female, and separating a multitude of viable male eggs from a multitude of viable female eggs, to form a predominantly male or predominantly female egg selection.

11. A system comprising the apparatus according to claim 10, further comprising an incubator for subjecting the viable female or male egg selection to an incubation and hatching process to form a predominantly female or male chick population, and/or means for subjecting the viable egg selections to an incubation and hatching process in line with the expected hatching date, to form a chick population of predominantly the same developmental stage.

12. A system according to claim 11, further comprising a candling apparatus for determining whether an embryo in an egg is viable, and a means for separating non-viable eggs prior to hatching.

13. The apparatus according to claim 2, wherein the at least first developmental marker compound is detected in the allantoic fluid of an egg.

14. The system according to claim 1, wherein the quantitative analytic apparatus is selected from the group consisting of:
   a magnetic resonance spectrometer, a Raman spectrometer, a Fourier transform infrared (FTIR) spectrometer, a GC coupled with a suitable detector, an HPLC coupled with a suitable detector, a fluorescence spectrometer, and an enzyme-linked immunosorbent assay system.

15. The apparatus according to claim 2, wherein the means for detecting and/or the means for measuring is selected from the group consisting of:

a magnetic resonance spectrometer, a Raman spectrometer, a FTIR spectrometer, a GC coupled with a suitable detector, an HPLC coupled with a suitable detector, a fluorescence spectrometer, and an enzyme-linked immunosorbent assay system.

* * * * *